United States Patent
Murray

(10) Patent No.: US 12,536,014 B2
(45) Date of Patent: Jan. 27, 2026

(54) SYSTEMS AND METHODS FOR RENDERING GRAPHS OF APPLICATIONS USING CONFIGURATION FILES

(71) Applicant: Change Healthcare Holdings, LLC, Nashville, TN (US)

(72) Inventor: Geoff Murray, Richmond (CA)

(73) Assignee: Change Healthcare Holdings, LLC, Nashville, TN (US)

( * ) Notice: Subject to any disclaimer, the term of this patent is extended or adjusted under 35 U.S.C. 154(b) by 302 days.

(21) Appl. No.: 17/555,892

(22) Filed: Dec. 20, 2021

(65) Prior Publication Data

US 2023/0195453 A1 Jun. 22, 2023

(51) Int. Cl.
*G06F 8/73* (2018.01)
(52) U.S. Cl.
CPC ...................... *G06F 8/73* (2013.01)
(58) Field of Classification Search
CPC ....................................................... G06F 8/73
See application file for complete search history.

(56) References Cited

U.S. PATENT DOCUMENTS

| | | | | |
|---|---|---|---|---|
| 2005/0187745 A1* | 8/2005 | Lurie | .......... | G16B 5/00 703/11 |
| 2012/0304148 A1* | 11/2012 | Braun | .......... | G06F 8/71 717/104 |
| 2016/0267271 A1* | 9/2016 | Prasad | .......... | G06F 21/564 |
| 2018/0025162 A1* | 1/2018 | Jin | .......... | G06F 21/577 726/25 |
| 2019/0138428 A1* | 5/2019 | Sumitomo | .......... | G06F 11/3616 |
| 2019/0361686 A1* | 11/2019 | Gnazdowsky | .......... | G06F 8/65 |
| 2020/0042712 A1* | 2/2020 | Foo | .......... | G06F 21/577 |
| 2020/0175071 A1* | 6/2020 | Ogrinz | .......... | G06F 16/284 |

(Continued)

OTHER PUBLICATIONS

Matthew Obetz et al., "Static Call Graph Construction in AWS Lambda Serverless Applications," 2019 [retrieved on Dec. 1, 2023], 11th USENIX Workshop on Hot Topics in Cloud Computing (HotCloud 19), pp. 1-8, downloaded from <url>:https://www.usenix.org/conference/hotcloud19/presentation/obetz. (Year: 2019).*

(Continued)

*Primary Examiner* — S. Sough
*Assistant Examiner* — Stephen D Berman
(74) *Attorney, Agent, or Firm* — MARSHALL, GERSTEIN & BORUN LLP

(57) ABSTRACT

A system for automatically tracking elements associated with a software application and for generating customizable graphs that capture the dependencies and message flows among the elements is provided. For a software application deployed in a cloud environment, configuration files used to deploy the elements of the software application are processed to extract information such as the name of each element and the names of messages used or produced by each element. This extracted data is combined with implicit data about the cloud environment such as data about elements used in the environment but that are not deployed using configuration files. Graph data is generated from the combined data that includes an object for each element and edges that represent message flows or dependencies between the elements. The graph data is used to render and display a graph of the software application.

16 Claims, 11 Drawing Sheets

(56) References Cited

U.S. PATENT DOCUMENTS

| | | | | |
|---|---|---|---|---|
| 2021/0064644 | A1* | 3/2021 | Lippsett | G06F 16/904 |
| 2021/0191706 | A1* | 6/2021 | Sn | G06F 11/3466 |
| 2022/0012069 | A1* | 1/2022 | Verma | G06F 3/04817 |
| 2022/0019476 | A1* | 1/2022 | Sanchez | G06F 9/5038 |
| 2022/0245470 | A1* | 8/2022 | Acharya | G06N 5/025 |

OTHER PUBLICATIONS

Vijay Walunj et al., "GraphEvo: Characterizing and Understanding Software Evolution using Call Graphs," 2019 [retrieved on Feb. 27, 2025], 2019 IEEE International Conference on Big Data (Big Data), pp. 4799-4807, downloaded from <url>:https://ieeexplore.ieee.org. (Year: 2019).*

Keith Andrews et al., "Visual Graph Comparison," 2009 [retrieved Sep. 12, 2025], 2009 13th International Conference Information Visualisation, pp. 62-67, downloaded from <url>:https://ieeexplore.ieee.org/abstract/document/5190876. (Year: 2009).*

Arne Schipper et al., "Visual Comparison of Graphical Models," 2009 [retrieved Sep. 12, 2025], 2009 14th IEEE International Conference on Engineering of Complex Computer Systems, pp. 335-340, downloaded from <url>:https://ieeexplore.ieee.org/abstract/document/5090544. (Year: 2009).*

Concepcio Roig et al., "A New Task Graph Model for Mapping Message Passing Applications," 2007 [retrieved Sep. 12, 2025], IEEE Transactions on Parallel and Distributed Systems, vol. 18, Issue 12, pp. 1740-1753, downloaded from <url>:https://ieeexplore.ieee.org/abstract/document/4359405. (Year: 2007).*

\* cited by examiner

SYSTEMS AND METHODS FOR RENDERING GRAPHS OF APPLICATIONS USING CONFIGURATION FILES

BACKGROUND

As cloud based systems development matures, and the cloud solutions involve more and more components and elements, many organizations move towards automating the deployment and upgrades of those systems. This is especially critical as the number of microservices grows, and the deployment through manual processes becomes unmanageable and extremely error prone.

Critical to the automation of deployment is the use of defined configuration information that controls how services are deployed within the cloud system. These deployment configuration information files can vary across systems and are stored in a variety of formats.

As the number of system components grow, the messaging and communication between the different components grows as well. The number of communication connections between elements usually grows at a faster than linear scale. This communication complexity then becomes very difficult to learn, track, and monitor.

Typically, organizations produce diagrams showing communication flows between elements. As cloud solutions become larger, they are also typically managed by a growing number of development teams, and these sorts of diagrams become an additional source of documentation that must be maintained, along with the deployment configuration files. When there are two sources of information considered to be the truth, there can be discrepancies created, and these discrepancies can easily cause a critical misunderstanding of how the system works. It is necessary to minimize these misunderstandings as part of a safe, secure, and reliable cloud-based system.

SUMMARY

In an embodiment, a system for automatically tracking elements associated with a software application and for generating customizable graphs that capture the dependencies and message flows among the elements is provided. For a software application deployed in a cloud computing environment, configuration files used to deploy the elements of the software application are processed to extract information such as the name of each element and the names of messages used or produced by each element. This extracted data is combined with implicit data about the cloud computing environment such as data about elements used in the environment but that are not deployed using configuration files. Graph data is generated from the combined data that includes an object for each element and edges that represent message flows or dependencies between the elements. The graph data is used to render and display a graph of the software application. The user can modify the displayed graph to focus on selected elements or messages.

In an embodiment, a method is provided. The method includes: receiving a selection of a first software application by a computing device, wherein the first software application comprises a plurality of elements and each element is associated with a configuration file; for each element of the plurality of elements, extracting element data from the configuration file associated with the element by the computing device, wherein the element data identifies a message of a plurality of messages; generating, from the extracted element data, graph data for the first software application by the computing device; and using the graph data, rendering a first graph of the first software application by the computing device, wherein the graph illustrates a flow between two or more elements of the plurality of elements for at least one message of the plurality of messages.

Embodiments may include some or all of the following features. The method may further include receiving a selection of the two or more elements and the at least one message. The configuration file may be a YAML file. The element data extracted from the configuration file associated with the element comprises one or more of: identifiers of messages of the plurality of messages that the element accepts; identifiers of messages of the plurality of messages that the element sends to other elements; or identifiers of one or more message queues that the element uses. The method may further include: receiving implicit data about a cloud computing environment associated with the first software application; and generating, from the extracted element data and the implicit data, the graph data for the first software application. The first software application may be deployed in a cloud-based computing system. The method may further include: receiving graph data for a second software application; and using the graph data for the first software application and the graph data for the second software application, rendering a second graph of the first software application and the second software application, wherein the second graph shows differences between the first software application and the second software application. The second software application may be a branch of the first software application. The elements of the plurality of elements may include services.

In an embodiment, a method is provided. The method may include: receiving a selection of a software application by a computing device; retrieving graph data associated with the software application by the computing device, wherein the graph data comprises a plurality of objects that each represent an element of a plurality of elements associated with the software application and a plurality of edges that each represent a message of a plurality of messages associated with the software application; receiving a selection of a subset of elements of the plurality of elements associated with the software application by the computing device; receiving a selection of a subset of messages of the plurality of messages associated with the software application; and using the objects representing the elements of the subset of elements and the edges representing the messages of the subset of messages, rendering a graph of the software application by the computing device, wherein the graph illustrates a flow between two or more elements of the subset of elements for at least one message of the subset of messages.

Embodiments may include some or all of the following features. Each element of the plurality of elements may be associated with a configuration file, and the method may further include: for each element of the plurality of elements, extracting element data from the configuration file associated with the element; and generating, from the extracted element data, the graph data for the software application. The configuration file may be a YAML file. The element data extracted from the configuration file associated with the element may include one or more of: identifiers of messages of the plurality of messages that the element accepts; identifiers of messages of the plurality of messages that the element sends to other elements; or identifiers of one or more message queues that the element uses.

In an embodiment, a system is provided. The system includes: at least one computing device; and a non-transitory computer-readable medium with computer-executable instructions stored thereon that when executed by the at least one computing device cause the at least one computing device to: receive a selection of a first software application, wherein the first software application comprises a plurality of elements and each element is associated with a configuration file; for each element of the plurality of elements, extract element data from the configuration file associated with the element, wherein the element data identifies a message of a plurality of messages; generate, from the extracted element data, graph data for the first software application; and using the graph data, render a first graph of the first software application, wherein the graph illustrates a flow between two or more elements of the plurality of elements for at least one message of the plurality of messages.

Embodiments may include some or all of the following features. The system may further include computer-executable instructions stored thereon that when executed by the at least one computing device cause the at least one computing device to: receive a selection of the two or more elements and the at least one message. The configuration file may be a YAML file. The element data extracted from the configuration file associated with the element may include one or more of: identifiers of messages of the plurality of messages that the element accepts; identifiers of messages of the plurality of messages that the element sends to other elements; or identifiers of one or more message queues that the element uses. The system may further include computer-executable instructions stored thereon that when executed by the at least one computing device cause the at least one computing device to: receive implicit data about a cloud computing environment associated with the first software application; and generate, from the extracted element data and the implicit data, the graph data for the first software application. The first software application may be deployed in a cloud-based computing system. The system may further include computer-executable instructions stored thereon that when executed by the at least one computing device cause the at least one computing device to: receive graph data for a second software application; and using the graph data for the first software application and the graph data for the second software application, render a second graph of the first software application and the second software application, wherein the second graph shows differences between the first software application and the second software application.

Additional advantages of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying figures, which are incorporated herein and form part of the specification, illustrate an application element tracking system and method. Together with the description, the figures further serve to explain the principles of the application element tracking system and method described herein and thereby enable a person skilled in the pertinent art to make and use the application catalog system and method.

FIGS. 3-7 are illustrations of example user interfaces for selecting applications and elements for a graph;

DETAILED DESCRIPTION

Figure 1:
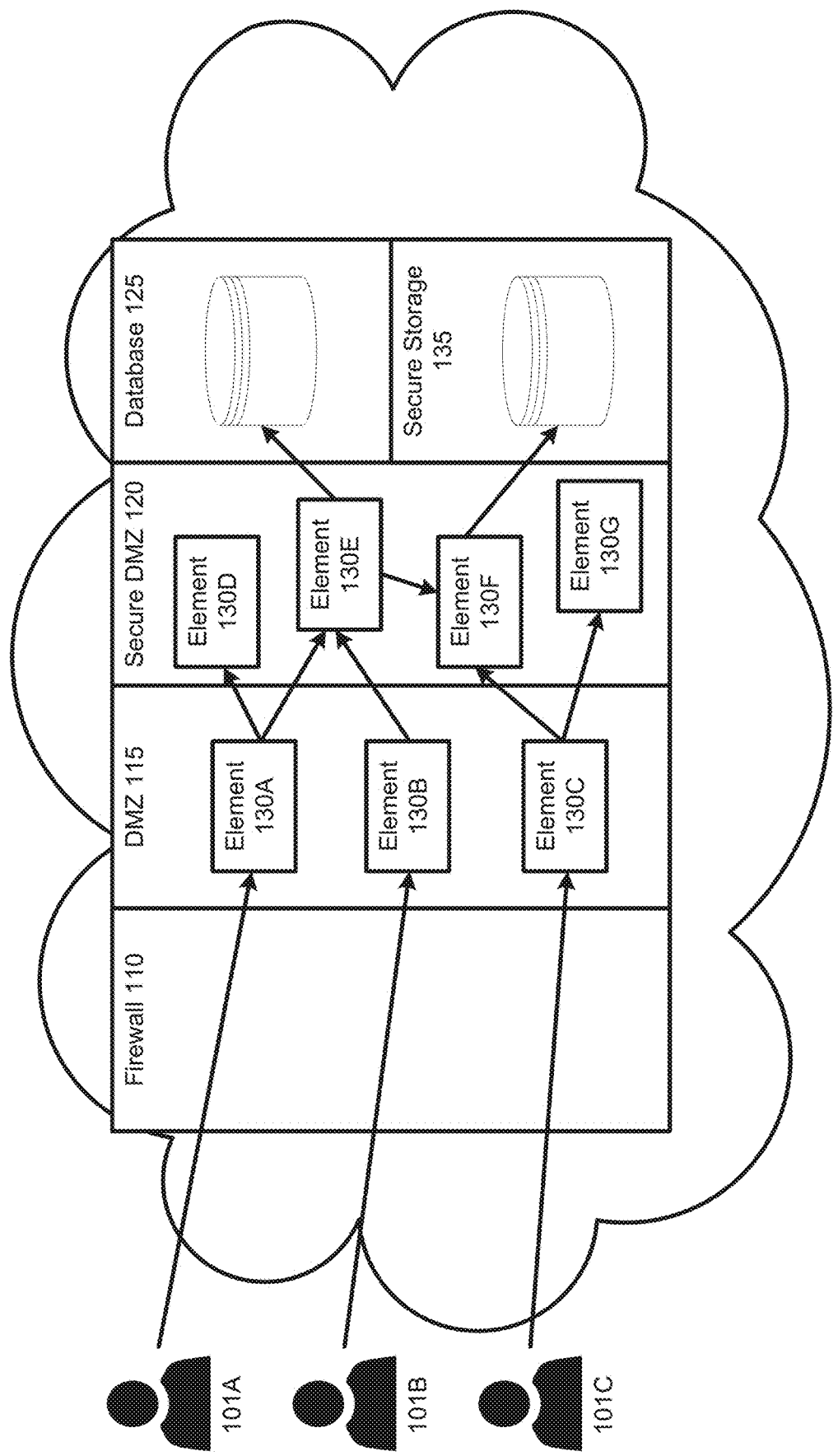
FIG. 1 is an example cloud computing environment for deploying elements of a software.

FIG. 1 is an example cloud computing environment 190 for deploying one or more elements 130. As used herein, an element 130 (e.g., the elements 130A-G) is software that may be deployed and executed in the cloud environment 190. Examples of elements 130 may include application programing interfaces, services, microservices, and processes. Other types of software elements 130 may be included. The cloud computing environment 190 may be a distributed collection of computing devices that provides computing and storage services to one or more users 101 (e.g., the users 101A-C) via the internet. Example computing devices include the computing device 1100 illustrated with respect to FIG. 11. The cloud computing environment 190 provides an abstraction of the underlying computing devices such that the users 101 who use the computing and storage services provided by the cloud computing environment 190 are unaware of the actual computing devices that are providing the computing and storage services.

To provide security, the processing components of the cloud computing environment 190 are divided into three components, a firewall component 110, a DMZ component 115, and a secure DMZ component 120. Communication between the elements 130 is illustrated by the various arrows.

Generally, the firewall component 110 controls access to the environment 190 by the one or more users 101. All requests from the users 101 are received and checked by the firewall component 110. Those requests that meet certain standards or rules are allowed to connect with one or more elements in the DMZ component 115. Other requests may be blocked by the firewall component 110.

The DMZ component 115 executes those elements 130 (e.g., the elements 130A, 130B, and 130C) that interact with one or more users 101 through the firewall 110. These elements 130 may include user facing applications and APIs executed by the cloud computing environment 190. The elements in the DMZ component 115 are only able to communicate with the users 101 through the firewall 110 or with elements 130 of the secure DMZ component 120. The elements 130 of the DMZ component 115 are not permitted to write to, or read from, either a database 125 or a secure storage 135.

The secure DMZ component 120 is more secure than the DMZ component 115, as no elements 130 in the secure DMZ component 120 are allowed to communicate directly with the users 101. However, the elements 130 of the secure DMZ component 120 are permitted to communicate with elements of the DMZ component 115, the secure DMZ component 120, as well as both the database 125 and the secure storage 135.

Because of the restrictions imposed by the components of the cloud computing environment 190, user facing applications typically include multiple elements 130 in both the DMZ component 115 and the secure DMZ component 120. For example, an application may include the element 130A executed by the DMZ component 115 that receives a request for a file from the user 101A and passes the request to the element 130E executed by the secure DMZ component 120. The element 130E may then retrieve the requested file from the database 125 and may pass the file to the element 130A. The element 130A may then provide the requested file to the user 101.

In general, communication between the various elements 130 may be performed using one or more messages. As may be appreciated, as more and more elements 130 are added to an application executing on the cloud computing environment 190, understanding and keeping track of the various message flows through the cloud computing environment 190 for the application may be difficult.

Figure 2:
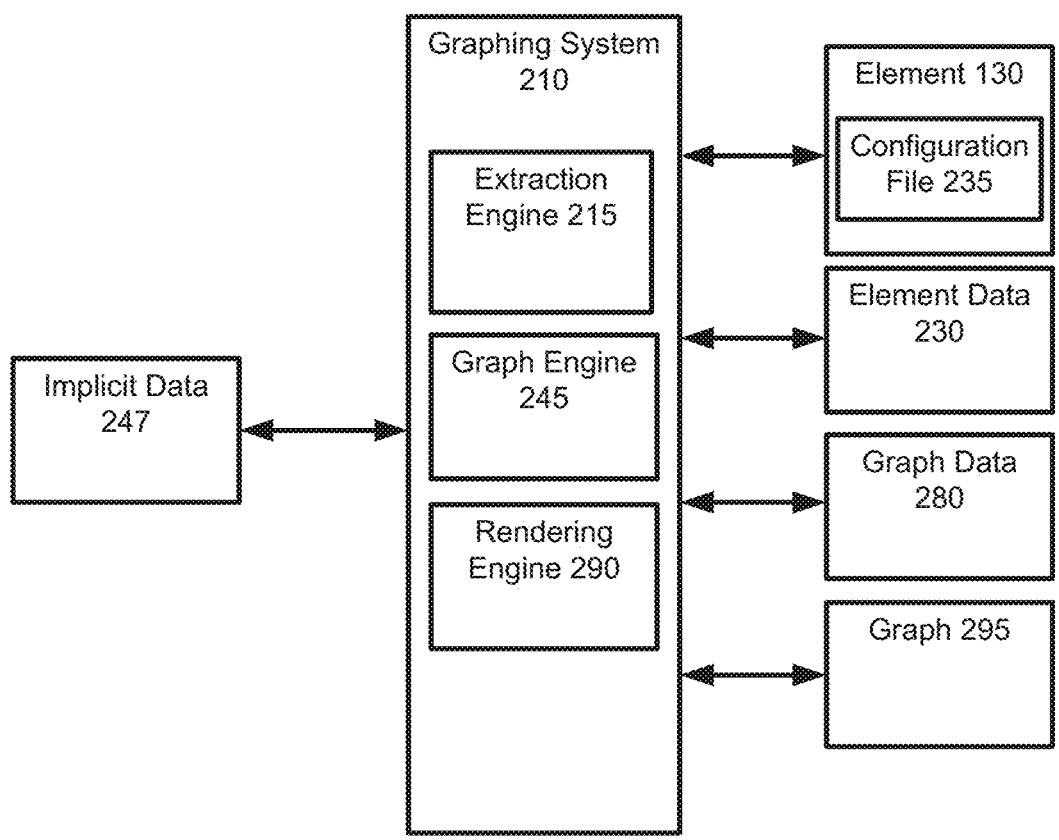
FIG. 2 is an illustration of example graphing system.

To provide for improved visualization of the services and message flows associated with an application in a cloud computing environment 190, in FIG. 2 a graphing system 210 is provided that generates one or more graphs 295 of a software application based on the elements 130 associated with the software application. As described further below, a user or an administrator may select one or more elements 130 (and associated messages) to visualize for an application. The graphing system 210 may then render and display a graph 295 that includes nodes for the selected elements 130 and edges that represent the message flows between the selected elements 130. The graph 295 may allow a user to quickly understand how removing or modifying a particular element 130 in the application will affect other elements 130 in the application based on the message flows.

The graphing system 210 includes one or more components including an extraction engine 215, a graph engine 245, and a rendering engine 290. More or fewer components may be supported. Some or all of the components of the graphing system 210 may be implemented together or separately by a general purpose computing device such as the computing device 1100 illustrated with respect to FIG. 11.

The extraction engine 215 may extract what is referred to as element data 230 from each element 130 associated with an application. Element data 230, among other things, may describe the particular message flows and/or dependencies associated with the element 130. Examples of element data 230 that may be associated with an element 130 such as a service include but are not limited to the name of the element 130, indications of where the element 130 executes in the environment 190 (i.e., the DMZ component 115 or the secure DMZ component 120), what messages the element 130 receives or accepts (i.e., what other elements 130 the element 130 is dependent on), what elements 130 the element 130 sends messages to (i.e., what other elements 130 are dependent on the element 130), what message queues (e.g., databases) the element 130 read from or write to, management rules used by the element 130, permissions associated with the element 130, and identifiers of any other resources that the element 130 may be dependent on. Other information may be included in the element data 230.

In some embodiments, the extraction engine 215 may extract the element data 230 for an element 130 from one or more configuration files 235 associated with the element 130. A configuration file 235 for an element 130 may be a file that is written or created by a user or a developer associated with the element 130 and may indicate the various resources and other elements 130 that the element 130 depends on or that are dependent on it. In particular, the configuration file 235 may indicate the messages that are consumed or generated by the associated element 130. The configuration files 235 are read and used when deploying their associated elements 130 into the environment 190. In some embodiments, the configuration file 235 may be written in a data serialization language such as YAML. Other languages may be used.

The graph engine 245 may receive the element data 230 extracted from the configuration files 235 and may convert the element data 230 into graph data 280. At a high level, the graph data 280 may include objects for each element 130 and edges that represent the message exchanges or dependencies between the elements 130.

The graph data 280 may be stored by the graph engine 245 using a graph database. A graph database is a database that uses graph structures for semantic queries with nodes, edges, and properties to represent and store data. Graph databases hold the relationships between data as a priority. Querying relationships is fast because they are perpetually stored in the database. Relationships can be intuitively visualized using graph databases, making them useful for heavily inter-connected data. A suitable graph database includes the Neo4J graph database. Other databases may be supported.

In addition to the element data 230 for an application, the graph engine 245 may further incorporate what is referred to herein as implicit data 247 into the graph data 280. The implicit data 247 may include information about the application (such as dependencies and permissions) or cloud environment 190 that are not reflected in any of the configuration files 235 associated with the elements 130. In particular, the implicit data 247 may include implicit objects that are active elements 130 in the overall cloud environment 190 but are not deployed through configuration files 235. These may include includes active elements 130 that might reside on-premises in a customer system, for example.

The implicit data 247 may further include implicit connections. The implicit connections are messages that are sent into the cloud environment 190 that originate from elements 130 that are not deployed using a configuration file 235.

The implicit data 247 may further include implicit boundaries. The implicit boundaries form the overall security boundary framework of the cloud-computing environment 190. This information is used to show the relationship between different boundary elements including the DMZ component 115 and the secure DMZ component 120.

The graph engine 245 may convert the element data 130 and implicit data 247 into objects in the graph data 280. Example objects that may be included in the graph data 280 include, but are not limited to, boundary objects, service objects, interface objects, permission objects, PubSubTopic objects, database objects, and bucket objects. Other types of objects may be supported.

The boundary objects may include objects for each security boundary or component of the environment 190 (e.g., the DMZ component 115 and the secure DMZ component 120). The service objects may include an object of each element 130 associated with a configuration file 235 as well as implicit elements 130 from the implicit data 247. The interface objects may include an object for any interface (incoming or outgoing) associated with the application. These may include APIs or other types of interfaces used to access the application by a user 101.

The permission objects may include an object for each permission granted to an element 130. The PubSubTopic objects may include any Google PubSub topic used or references by any of the elements 130. The database objects may include databases instantiated by an element 130 of the application. The bucket objects may include GCP storage buckets instantiated by an element 130 of the application.

The graph data 280 may further include a plurality of relationships or edges that connect the objects. Examples of relationships include sending or receiving a message to or from an object and reading or writing data to an object. Other types of relationships may be supported.

The rendering engine 290 may use the graph data 280 to generate or render a graph 295 that represents an application including the various elements 130 and message flows associated with the application. The user can view a graph 295 that represents the entire application, or the user can select the elements 130 that they are interested in and can view a graph 295 that only includes the selected elements 130. In addition, the user may specify the particular messages and/or message flows in the application, and the rendering engine 290 may render a graph 295 that shows the specified messages and/or message flows along with the associated elements 130 from the application.

In some embodiments, the rendering engine 290 may allow a user to compare two versions or branches of the same application using graphs 295. For example, the rendering engine 290 may generate a graph 295 that highlights the differences between the two branches including added or removed elements 130 and changes to the messages and/or message flows between the elements 130.

Figure 3:
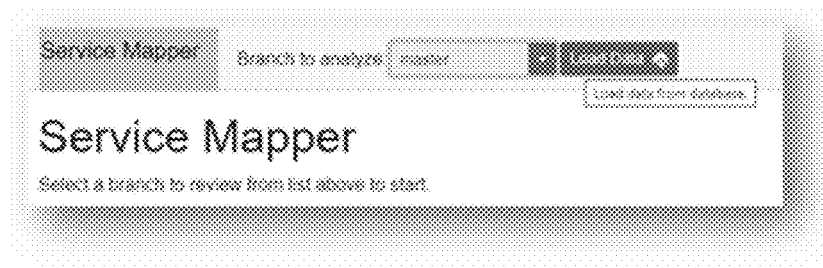

FIG. 3 is an illustration of an example user interface 300 that may be provided by the rendering engine 290 to allow a user to create a customized graph 295. In the example shown, the user has selected a branch of an application called "master." The user may load the graph data 280 corresponding to the application by selecting the button labeled "Load Data."

Figure 4:
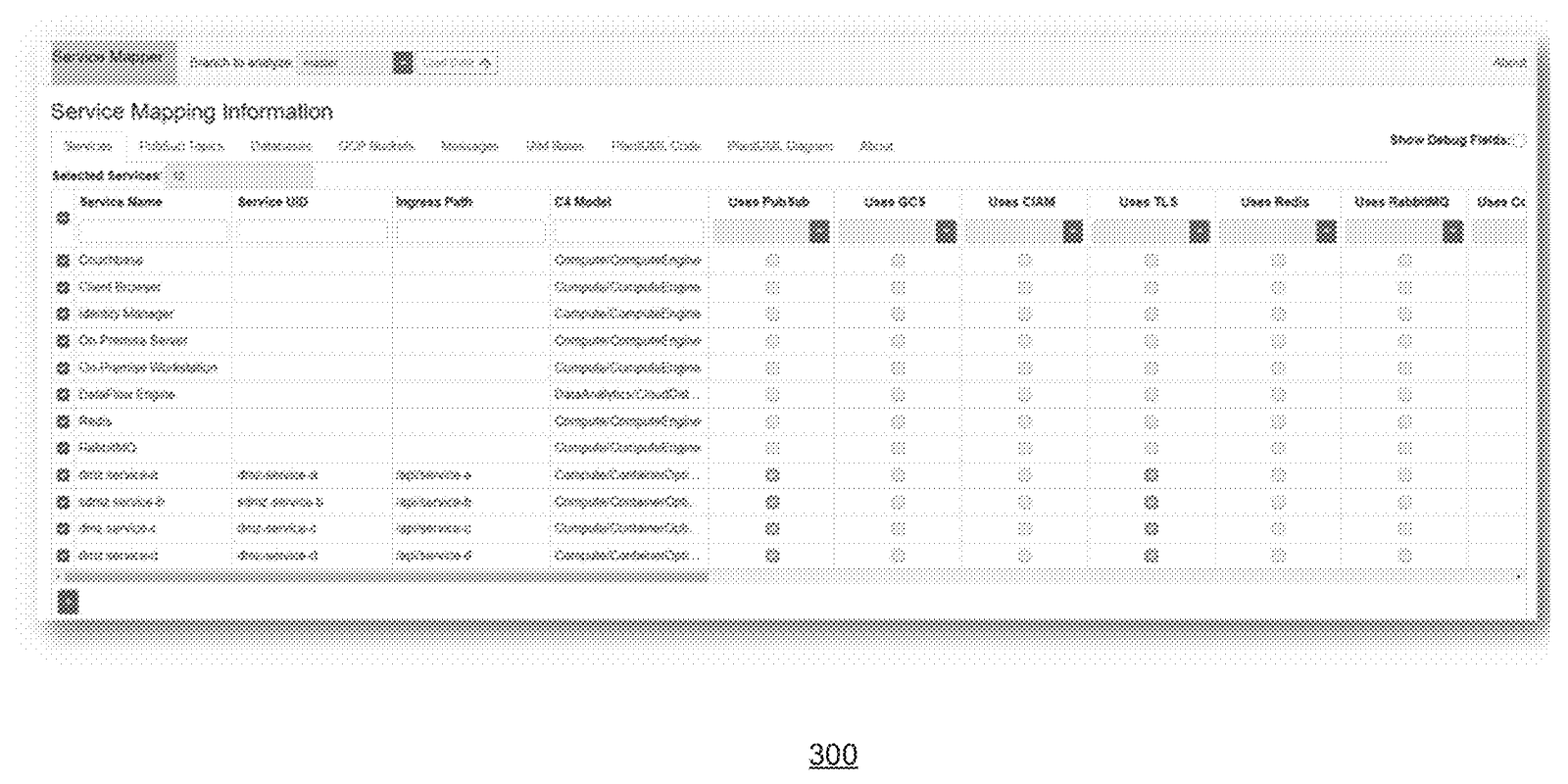

Continuing to FIG. 4, the rendering engine 290 has updated the user interface 300 to include various information about the selected application. In the example shown, the user interface includes tabs related to the various types of objects collected in the graph data 280 for the application such as "Services", "PubSub Topics", Databases,"GCP Bucket", and "Messages." The user has selected the tab labeled "Services" and the user interface 300 displays the services associated with the objects of the graph data 280 in a table. In the example shown in FIG. 4, the table includes a row for each service, and column for each attribute associated with the service such as "Service Name", "Service UID", "Ingress Path", and "Uses PubSub."

Figure 5:
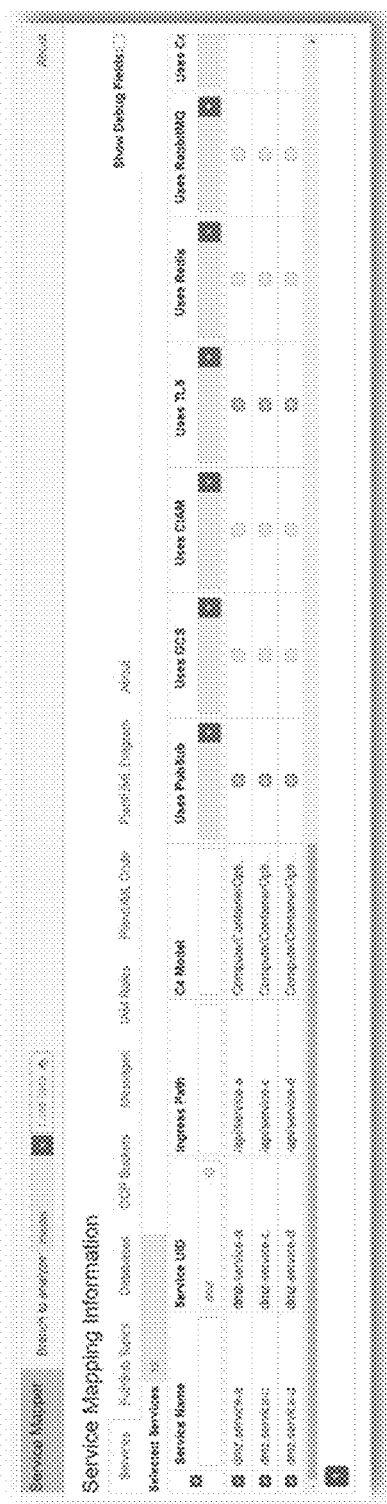

Continuing to FIG. 5, the user has selected to filter the displayed services based on the service UID. In the example shown, the user has entered the service UID "dmz" and the table of the user interface 300 has been updated to show only those objects that are associated with the service UID "dmz."

Figure 6:
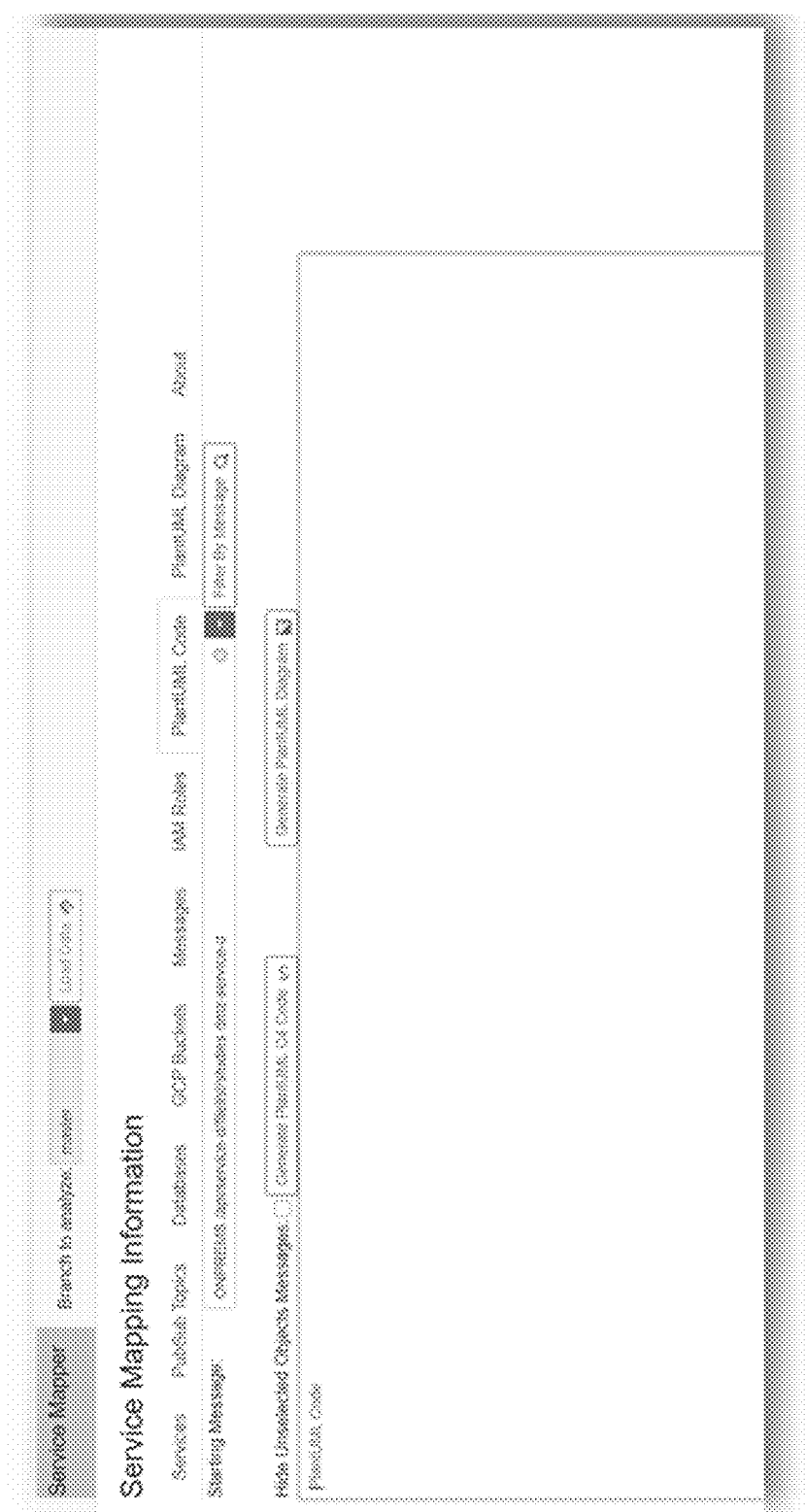

Continuing to FIG. 6, the user may also be able to filter elements 130 or services based on messages or message flows. In the example shown, the user has decided to filter based on messages flowing from the message "ONPREMS" beginning from the object "dmz-service-d."

Figure 7:
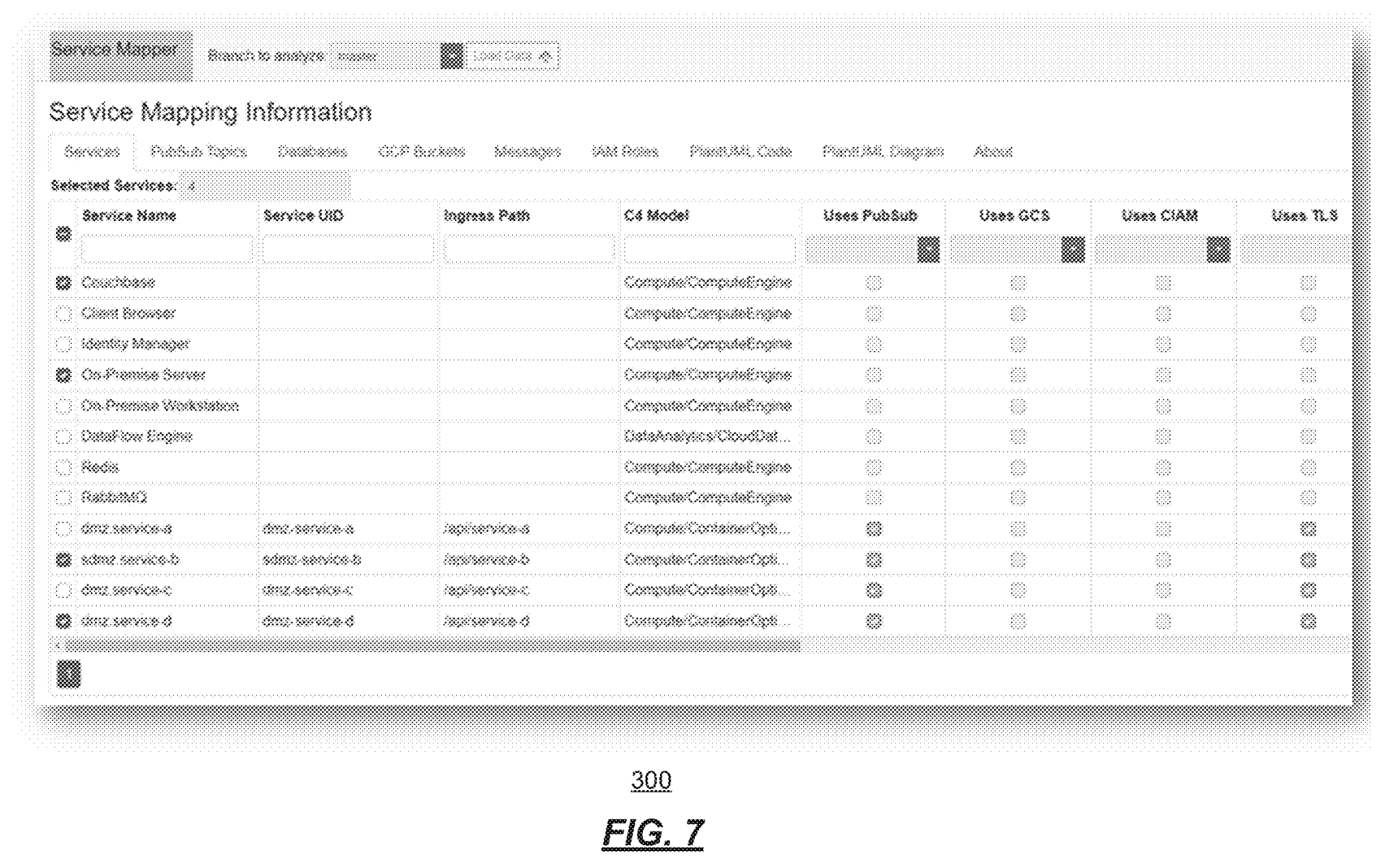

Continuing to FIG. 7, after filtering by the selected message, the user interface 300 has been updated to show the elements 130 (e.g., services) that are associated with the message "ONPREMS". In the example shown, the elements 130 associated with the message "ONPREMS" are shown in the "Service Name" column with an adjacent checkmark.

After the user selects the elements 130 and messages for the graph 295, the rendering engine 290 may render and display a graph 295 corresponding to the selected elements 130 and messages. In some embodiments, the rendering engine 290 may further generate code from the graph data 280 in a format that is suitable for use by one or more rendering or diagraming applications such as PlantUML. Other types of applications may be supported.

Figure 8:
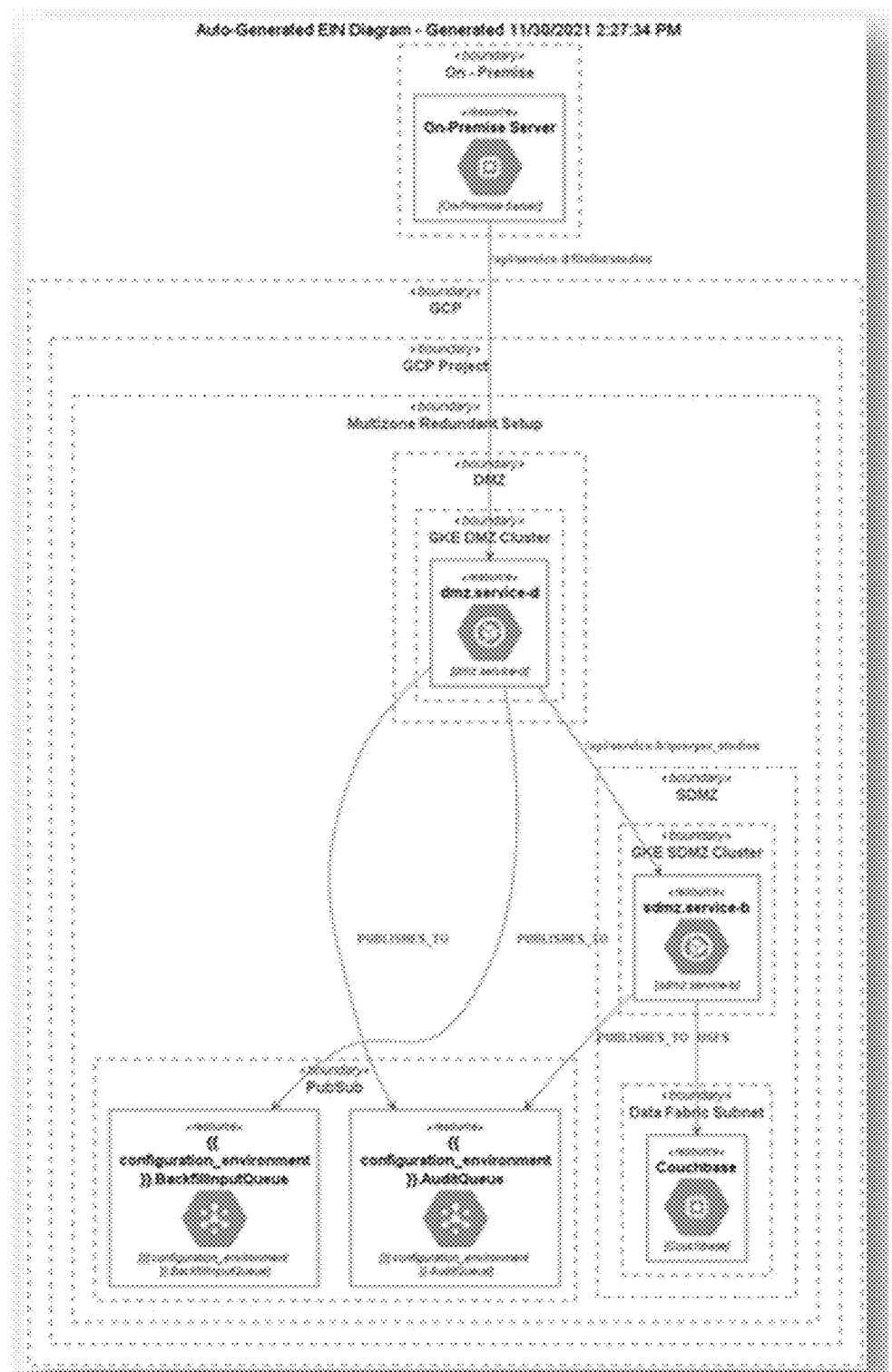
FIG. 8 is an illustration of an example graph.

FIG. 8 is an illustration of an example graph 295 generated by the rendering engine 290 based on the selected elements 130 and messages. As shown, the graph 295 includes a plurality of nodes representing the selected elements 130 and edges representing the message flow between the elements 130.

Figure 9:
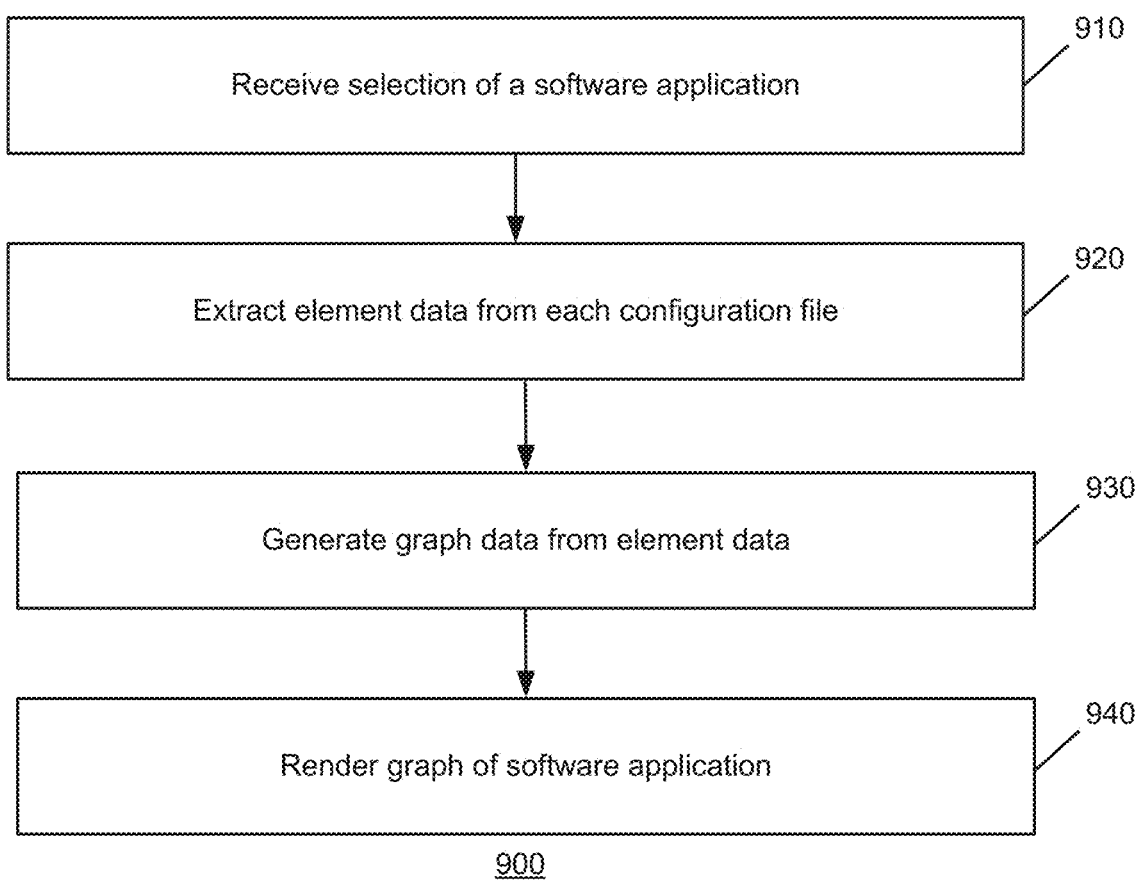
FIG. 9 is an illustration of an example method for generating a graph for a selected application.

FIG. 9 is an illustration of an example method for generating a graph based on a selected application. The method 900 may be implemented by the graphing system 210.

At 910, a software application is selected. The software application may be selected by a user through a user interface provided by the graphing system 210. The software application may be a branch of another software application. The software application may include a plurality of elements 130 such as services. Each element 130 may further be associated with a configuration file 235 such as a YAML file. The configuration file 235 may be used to deploy the associated element 130 in a cloud computing environment.

At 920, for each element of the plurality of elements of the software application, element data is extracted from the associated configuration file. The element data 230 may be extracted from the configuration file 235 by the extraction engine 215. The element data 230 may identify a plurality of messages sent and received by the element 130. In some embodiments, the element data 230 may include identifiers of the messages that the element 130 accepts, identifiers of the messages that the element 130 generates, and identifiers of any message queues that the element 130 uses (i.e., reads from or writes to).

At 930, graph data is generated from the extracted element data. The graph data 280 may be generated by the graph engine 245. The graph data may include objects for each of the elements 130 identified in the element data 230 and edges that represent the messages, and other dependencies, between the elements 130 associated with the objects. The graph data 280 may be stored in a graph database.

In some embodiments, the graph engine 245 may further generate graph data 280 using implicit data 247. The implicit data 247 may include information about the cloud computing environment 190 where the elements 130 associated with the selected application are deployed. This information may include information about elements 130 that are deployed in the cloud-based environment 190 but that are not associated with a configuration file 235.

At 940, a graph of the software application is rendered. The graph 295 may be rendered by the rendering engine 290 from the graph data 280. The rendering of the graph 295 may illustrate a flow (e.g., message flow) between at least two elements 130 of the application for at least one message. The at least two elements 130 and at least one message may have been selected by the user for the rendered graph 295 using a same user interface or a different user interface that was used to select the software application.

Figure 10:
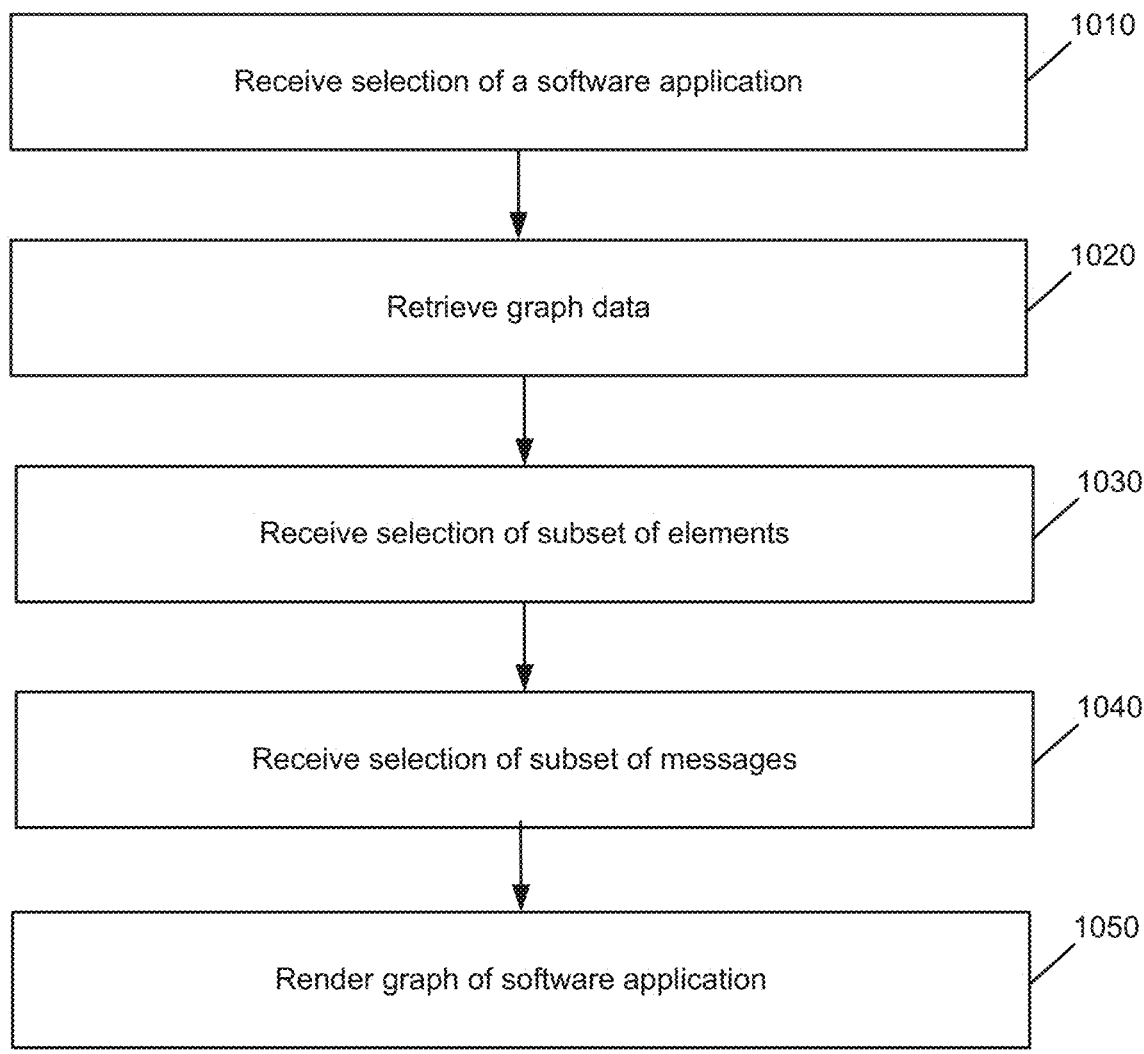
FIG. 10 is an illustration of an example method for generating a graph for a selected application.

FIG. 10 is an illustration of an example method for generating a graph based on selected elements and messages of a selected application. The method 1000 may be implemented by the graphing system 210.

At 1010, a software application is selected. The software application may be selected by a user through a user interface provided by the graphing system 210. The software application may include a plurality of elements 130 such as services. Each element may further be associated with a configuration file 235 such as a YAML file. The configuration file 235 may be used to deploy the associated element 130 in a cloud computing environment.

At 1020, graph data associated with the selected application is retrieved. The graph data may be retrieved by the rendering engine 290 from the graph engine 245. In some embodiments, the graph data 280 may be a plurality of objects associated with the software application. The objects of the plurality of objects may represent elements 130 associated with the software application such as services. Graph data 280 may further include objects associated with a cloud computing environment 190 that executed the application. These objects may be based on implicit data 247 and may include information about the cloud computing environment 190 where the elements 130 associated with the selected application are deployed.

At 1030, a selection of a subset of the elements is received. The selection may be received by the rendering engine 290. In some embodiments, the user may use the user interface provided by the graphing system 210 to select the elements 130.

At 1040, a selection of a subset of the messages is received. The selection may be received by the rendering engine 290. In some embodiments, the user may use the user interface provided by the graphing system 210 to select the messages. The selected messages in the subset of messages may be messages that are either received or provided by the elements in the subset of elements.

At 1050, a graph of the software application is rendered. The graph 295 may be rendered by the rendering engine 290 from the graph data 280 using the objects corresponding to the elements 130 in the subset of elements 130 and the edges corresponding to the messages in the subset of messages. The rendering of the graph 295 may illustrate a flow (e.g., message flow) between two or more elements of the subset of elements for at least one message of the subset of messages.

Figure 11:
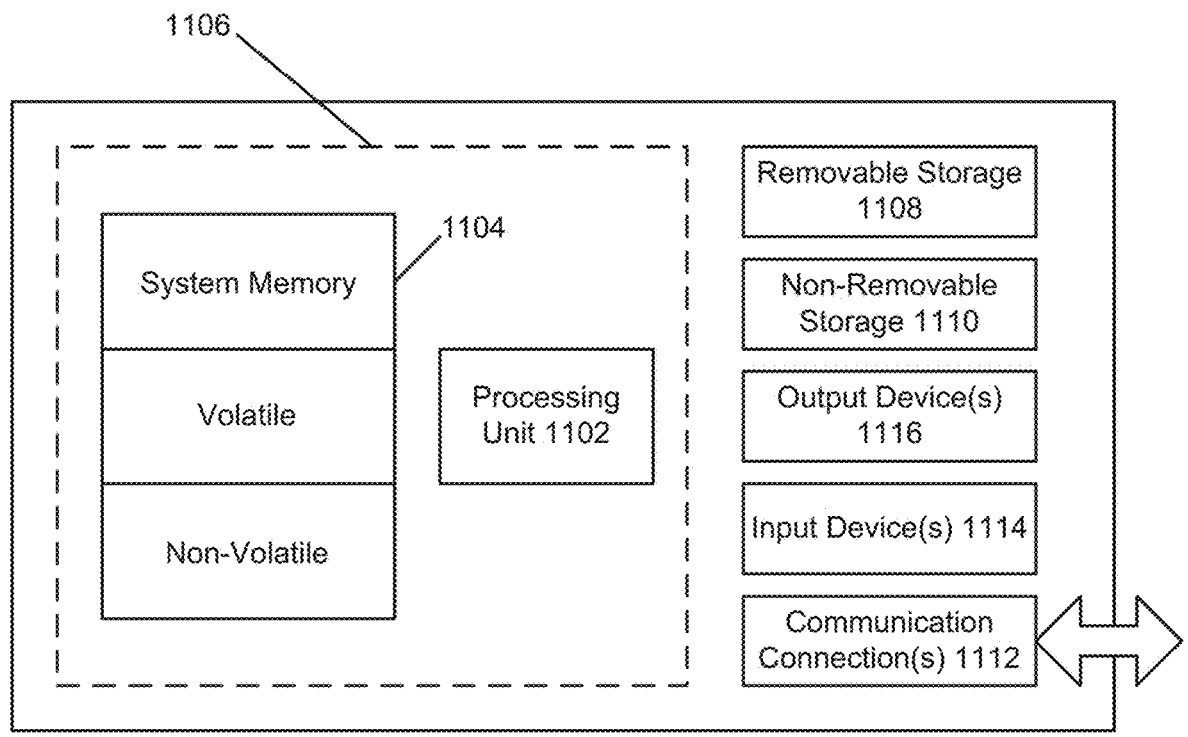
FIG. 11 shows an exemplary computing environment in which example embodiments and aspects may be implemented.

FIG. 11 shows an exemplary computing environment in which example embodiments and aspects may be implemented. The computing device environment is only one example of a suitable computing environment and is not intended to suggest any limitation as to the scope of use or functionality.

Numerous other general purpose or special purpose computing devices environments or configurations may be used. Examples of well-known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 11, an exemplary system for implementing aspects described herein includes a computing device, such as computing device 1100. In its most basic configuration, computing device 1100 typically includes at least one processing unit 1102 and memory 1104. Depending on the exact configuration and type of computing device, memory 1104 may be volatile (such as random access memory (RAM)), non-volatile (such as read-only memory (ROM), flash memory, etc.), or some combination of the two. This most basic configuration is illustrated in FIG. 11 by dashed line 1106.

Computing device 1100 may have additional features/functionality. For example, computing device 1100 may include additional storage (removable and/or non-removable) including, but not limited to, magnetic or optical disks or tape. Such additional storage is illustrated in FIG. 11 by removable storage 1108 and non-removable storage 1110.

Computing device 1100 typically includes a variety of computer readable media. Computer readable media can be any available media that can be accessed by the device 1100 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 1104, removable storage 1108, and non-removable storage 1110 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1100. Any such computer storage media may be part of computing device 1100.

Computing device 1100 may contain communication connection(s) 1112 that allow the device to communicate with other devices. Computing device 1100 may also have input device(s) 1114 such as a keyboard, mouse, pen, voice input device, touch input device, etc. Output device(s) 1116 such as a display, speakers, printer, etc. may also be included. All these devices are well known in the art and need not be discussed at length here.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:

receiving, by one or more processors, a selection of a first software application, wherein the first software application comprises a first plurality of elements, wherein each element of the first plurality of elements is (i) represented by a respective one of a first plurality of nodes of graph data and (ii) reflected in a configuration file;

for each element of the first plurality of elements, extracting, by the one or more processors, element data from the configuration file associated with the element;

receiving, by the one or more processors, implicit data indicative of a second plurality of elements, wherein each element of the second plurality of elements is (i) represented by a respective one of a second plurality of nodes of the graph data and (ii) not reflected in any configuration file;

generating, by the one or more processors and from (i) the extracted element data for each element of the first plurality of elements and (ii) the implicit data, the graph data for the first software application, wherein the graph data includes (i) the first plurality of nodes and the second plurality of nodes and (ii) edges that represent a plurality of messages exchanged among the first plurality of elements and the second plurality of elements;

displaying, by the one or more processors, each element of the first plurality of elements, each element of the second plurality of elements, and each message of the plurality of messages on a display;

receiving, by the one or more processors, a selection of two or more elements of the displayed first and second plurality of elements and at least one message of the displayed plurality of messages;

in response to the selection of the two or more elements, and using the graph data, rendering, by the one or more processors, a first graph of the first software application on the display, wherein the first graph illustrates a flow between the selected two or more elements for the selected at least one message of the plurality of messages;

receiving, by the one or more processors, graph data for a second software application; and using the graph data for the first software application and the graph data for the second software application, rendering, by the one or more processors, a second graph of the first software application and the second software application on the display, wherein the second graph identifies differences between the first software application and the second software application, including highlighting at least a flow that is between a same pair of elements, but is associated with a different message, in the first software application and the second software application.

2. The method of claim 1, wherein the configuration file is a Yet Another Markup Language file.

3. The method of claim 1, wherein the element data extracted (i) for each element of the first plurality of elements and (ii) from the configuration file associated with the element comprises one or more of:

identifiers of messages of the plurality of messages that the element accepts;

identifiers of messages of the plurality of messages that the element sends to other elements; or identifiers of one or more message queues that the element uses.

4. The method of claim 1, wherein the implicit data are about a cloud computing environment associated with the first software application.

5. The method of claim 1, wherein the first software application is deployed in a cloud-based computing system.

6. The method of claim 1, wherein the second software application is a branch of the first software application.

7. The method of claim 1, wherein the elements of the first plurality of elements comprise services.

8. A system comprising:

one or more processors; and at least one memory storing processor-executable instructions that, when executed by the one or more processors, cause the one or more processors to perform operations comprising:

receiving a selection of a first software application, wherein the first software application comprises a first plurality of elements, wherein each element of the first plurality of elements is (i) represented by a respective one of a first plurality of nodes of graph data and (ii) reflected in a configuration file;

for each element of the first plurality of elements, extracting element data from the configuration file associated with the element;

receiving implicit data indicative of a second plurality of elements, wherein each element of the second plurality of elements is (i) represented by a respective one of a second plurality of nodes of the graph data and (ii) not reflected in any configuration file;

generating, from (i) the extracted element data for each element of the first plurality of elements and (ii) the implicit data, the graph data for the first software application, wherein the graph data includes (i) the first plurality of nodes and the second plurality of nodes and (ii) edges that represent a plurality of messages exchanged among the first plurality of elements and the second plurality of elements;

displaying each element of the first plurality of elements, each element of the second plurality of elements, and each message of the plurality of messages on a display;

receiving a selection of two or more elements of the displayed first and second plurality of elements and at least one message of the displayed plurality of messages;

in response to the selection of the two or more elements, and using the graph data, rendering a first graph of the first software application on the display, wherein the first graph illustrates a flow between the selected two or more elements for the selected at least one message of the plurality of messages;

receiving graph data for a second software application; and using the graph data for the first software application and the graph data for the second software application, rendering a second graph of the first software application and the second software application on the display, wherein the second graph identifies differences between the first software application and the second software application, including highlighting at least a flow that is between a same pair of elements, but is associated with a different message, in the first software application and the second software application.

9. The system of claim 8, wherein the configuration file is a Yet Another Markup Language file.

10. The system of claim 8, wherein the element data extracted (i) for each element of the first plurality of elements and (ii) from the configuration file associated with the element comprises one or more of:
   identifiers of messages of the plurality of messages that the element accepts;
   identifiers of messages of the plurality of messages that the element sends to other elements; or
   identifiers of one or more message queues that the element uses.

11. The system of claim 8, wherein the implicit data are about a cloud computing environment associated with the first software application.

12. The system of claim 8, wherein the first software application is deployed in a cloud-based computing system.

13. One or more non-transitory computer-readable media storing processor-executable instructions that, when executed by one or more processors, cause the one or more processors to perform operations comprising:
   receiving a selection of a first software application, wherein the first software application comprises a first plurality of elements, wherein each element of the first plurality of elements is (i) represented by a respective one of a first plurality of nodes of graph data and (ii) reflected in a configuration file;
   for each element of the first plurality of elements, extracting element data from the configuration file associated with the element;
   receiving implicit data indicative of a second plurality of elements, wherein each element of the second plurality of elements is (i) represented by a respective one of a second plurality of nodes of the graph data and (ii) not reflected in any configuration file;
   generating, from (i) the extracted element data for each element of the first plurality of elements and (ii) the implicit data, the graph data for the first software application, wherein the graph data includes (i) the first plurality of nodes and the second plurality of nodes and (ii) edges that represent a plurality of messages exchanged among the first plurality of elements and the second plurality of elements;
   displaying each element of the first plurality of elements, each element of the second plurality of elements, and each message of the plurality of messages on a display;
   receiving a selection of two or more elements of the displayed first and second plurality of elements and at least one message of the displayed plurality of messages;
   in response to the selection of the two or more elements, and using the graph data, rendering a first graph of the first software application on the display, wherein the first graph illustrates a flow between the selected two or more elements for the selected at least one message of the plurality of messages;
   receiving graph data for a second software application; and
   using the graph data for the first software application and the graph data for the second software application, rendering a second graph of the first software application and the second software application on the display, wherein the second graph identifies differences between the first software application and the second software application, including highlighting at least a flow that is between a same pair of elements, but is associated with a different message, in the first software application and the second software application.

14. The one or more non-transitory computer-readable media of claim 13, wherein the configuration file is a Yet Another Markup Language file.

15. The one or more non-transitory computer-readable media of claim 13, wherein the element data extracted (i) for each element of the first plurality of elements and (ii) from the configuration file associated with the element comprises one or more of:
   identifiers of messages of the plurality of messages that the element accepts;
   identifiers of messages of the plurality of messages that the element sends to other elements; or
   identifiers of one or more message queues that the element uses.

16. The one or more non-transitory computer-readable media of claim 13, wherein the implicit data are about a cloud computing environment associated with the first software application.

* * * * *